US012603789B2

(12) United States Patent
Kühne et al.

(10) Patent No.: US 12,603,789 B2
(45) Date of Patent: Apr. 14, 2026

(54) SYSTEMS AND METHODS FOR SECURING INTERCONNECTING DIRECTORIES

(71) Applicant: VOCALINK INTERNATIONAL LIMITED, London (GB)

(72) Inventors: Boy-Anthony Kühne, London (GB); Christopher Paul Kendall, Leighton Buzzard (GB); David Andrew Bray, Richmansworth (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 202 days.

(21) Appl. No.: 18/367,885

(22) Filed: Sep. 13, 2023

(65) Prior Publication Data

US 2024/0089122 A1 Mar. 14, 2024

Related U.S. Application Data

(63) Continuation-in-part of application No. 18/243,535, filed on Sep. 7, 2023.

(60) Provisional application No. 63/456,778, filed on Apr. 3, 2023, provisional application No. 63/406,542, filed on Sep. 14, 2022.

(51) Int. Cl.
*H04L 9/08* (2006.01)
*H04L 9/32* (2006.01)

(52) U.S. Cl.
CPC .......... *H04L 9/3268* (2013.01); *H04L 9/0825* (2013.01); *H04L 9/3247* (2013.01)

(58) Field of Classification Search
CPC .... H04L 9/3268; H04L 9/0825; H04L 9/3247
See application file for complete search history.

(56) References Cited

U.S. PATENT DOCUMENTS

| | | | | |
|---|---|---|---|---|
| 10,454,690 | B1 * | 10/2019 | Popoveniuc | .......... H04L 9/3268 |
| 10,728,044 | B1 * | 7/2020 | Melo | ...................... H04L 9/0825 |
| 12,224,991 | B1 * | 2/2025 | Joglekar | ............. H04L 63/0478 |
| 2003/0070070 | A1 * | 4/2003 | Yeager | ................... H04L 61/00 |
| | | | | 713/157 |
| 2007/0073621 | A1 * | 3/2007 | Dulin | ...................... G06F 21/33 |
| | | | | 705/50 |

(Continued)

OTHER PUBLICATIONS

U.S. Appl. No. 18/243,535, filed Sep. 7, 2023, Welsford, et al.

*Primary Examiner* — Darshan I Dhruv
(74) *Attorney, Agent, or Firm* — Harness, Dickey & Pierce, P.L.C.

(57) ABSTRACT

Systems and methods are provided for deploying keys in connection with proxy resolution. One example computer-implemented method includes distributing, by a service core computing device, a root certificate signed by a certificate authority and an intermediate certificate, which is signed by a root private key associated with the root certificate, and receiving, from a participant, a signing request for a participant certificate including a participant public key. The method also includes assessing, by the service core computing device, the signing request for the participant certificate and signing, by the service core computing device, the participant certificate with an intermediate public key included in the intermediate certificate. The method then includes disseminating the signed participant certificate to the participant and another participant, whereby the participants on the participant certificate based on the participant certificate being signed by the intermediate public key.

19 Claims, 6 Drawing Sheets

(56) References Cited

U.S. PATENT DOCUMENTS

| | | | |
|---|---|---|---|
| 2009/0193443 A1 | 7/2009 | Lakshmanan et al. | |
| 2011/0289508 A1 | 11/2011 | Fell et al. | |
| 2012/0216035 A1* | 8/2012 | Leggette | G06F 3/0643 |
| | | | 713/157 |
| 2013/0117560 A1* | 5/2013 | Resch | H04L 63/0823 |
| | | | 713/157 |
| 2014/0040415 A1 | 2/2014 | Mathew et al. | |
| 2015/0262160 A1 | 9/2015 | Hursta | |
| 2015/0278808 A1* | 10/2015 | Dulin | H04L 63/0823 |
| | | | 726/10 |
| 2016/0125370 A1 | 5/2016 | Grassadonia et al. | |
| 2016/0180299 A1 | 6/2016 | Sandraz | |
| 2017/0093587 A1* | 3/2017 | Glisson | H04L 63/062 |
| 2017/0302755 A1 | 10/2017 | Mathew et al. | |
| 2019/0036711 A1* | 1/2019 | Qiu | H04L 9/3268 |
| 2019/0363896 A1* | 11/2019 | Finlow-Bates | G06Q 20/36 |
| 2020/0028842 A1* | 1/2020 | Leiserson | H04L 9/3268 |
| 2020/0076807 A1* | 3/2020 | Driever | H04L 9/085 |
| 2020/0275272 A1* | 8/2020 | Montemurro | H04L 63/0876 |
| 2020/0311722 A1 | 10/2020 | Ginger et al. | |
| 2020/0322332 A1* | 10/2020 | Haque | H04L 63/0869 |
| 2021/0083882 A1* | 3/2021 | Venable, Sr. | H04L 9/3268 |
| 2021/0135884 A1* | 5/2021 | Theodorou | H04L 63/062 |
| 2021/0247731 A1* | 8/2021 | Poluri | G06T 19/006 |
| 2021/0288822 A1* | 9/2021 | Sorensen | H04L 9/0877 |
| 2022/0393884 A1* | 12/2022 | Panchamia | H04L 9/083 |

* cited by examiner

SYSTEMS AND METHODS FOR SECURING INTERCONNECTING DIRECTORIES

CROSS-REFERENCE TO RELATED APPLICATIONS

This application claims the benefit of, and priority to, U.S. Provisional Application No. 63/406,542, filed on Sep. 14, 2022, and U.S. Provisional Application No. 63/456,778, filed on Apr. 3, 2023. This application is also a continuation-in-part of U.S. patent application Ser. No. 18/243,535, filed on Sep. 7, 2023. The entire disclosure of each of the above-referenced applications is incorporated herein by reference.

FIELD

The present disclosure is generally directed to systems and methods for securing interconnecting directories, through core proxy services.

BACKGROUND

This section provides background information related to the present disclosure which is not necessarily prior art.

Data structures are known for storing data, whereby data may be retrieved in response to a request for the particular data. Federated storage provides for a collection of different data structures, each including the same or different data. When a request for data is received, the federated storage identifies the location of the data among the different data structures, retrieves the data and then returns the data. In this manner, the federated storage includes a central custodian, which manages the storage of the data across the data structures and acts to locate specific data in response to the request.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data structures may include directories of specific data, such as, for example, identifying data and proxies specific to the identifying data. The data structures, in turn, may be separate in the context of geographic location, ownership and/or control, such that access to particular data involves a particular data structure. It is problematic, in various implementations, though, to secure interactions among different entities in connection with retrieving said identifying information (e.g., resolving proxies, etc.), for a given request and for specific authorized parties.

Uniquely, the systems and methods herein provide for distribution and/or deployment of security keys, or more generally, certificates, in connection with directory requests, whereby the security keys are provided for identifying authorized parties. The security keys are usable in connection with the requests to enable entities to resolve proxies based on confidence in the requests being associated with the specific security keys. In this manner, the interactions between the different entities are secured based on a trusted issuance of security keys, often in layers, whereby differing life times of the security keys promote efficiencies.

Figure 1:
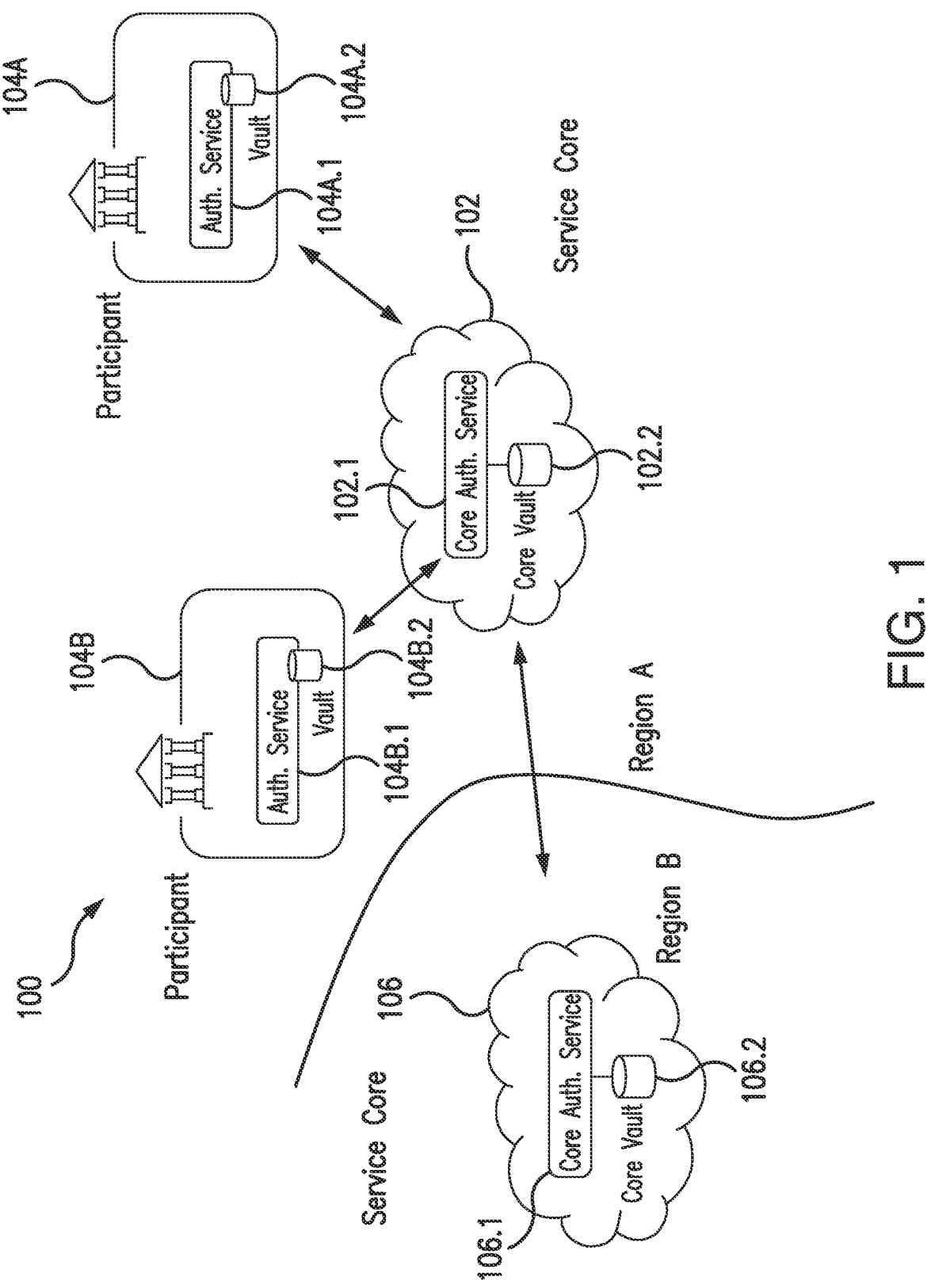
FIG. 1 illustrates an example system of the present disclosure suitable for use in associating keys for securing identifying data.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, distribution of directories in/or between different regions, relations among participants, privacy concerns and/or requirements, etc.

The illustrated system 100 generally includes a service core 102 and multiple participants 104A and 104B, each of which is coupled to one or more networks. The network(s) (as indicated by the arrowed lines in FIG. 1) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof, etc.

In this example embodiment, the participants 104A, 104B, for example, include banking institutions, or banks or other financial institutions, which are associated with various users (or customers) (not shown). In particular, each of the participants 104A, 104B is configured to issue accounts to users, and the accounts are each associated with a unique account identifier (e.g., account number (alone or in combination with a routing number), primary account number (PAN), virtual account number, wallet identification number, etc.), alone or in combination with expiration dates, verification codes, etc. (broadly, all account data). Account data should be understood to be any identifying data associated with an account, from which the account may be identified, based on the account data, alone or in combination with other data. The accounts may be credit accounts, debit accounts, prepaid accounts, checking accounts, or other types of financial/currency accounts, which are issued by the participants, for example, to fund a transaction (e.g., purchase, money transfer, etc.) by the various users.

In connection therewith, the participants 104A, 104B are configured to link the account data to a proxy. A proxy is generally different than the account number and may include, for example, data known to the user, and unique to the user. In this example, the proxy includes a phone number, or more specifically, a mobile phone number, but may include, in other examples, an email address, government-issued number/identifier, account verification information, or other numeric, alpha or alpha-numeric string, etc. In general, the proxy may include any type of alias linked to the account data (but, again, different than the account number associated with the account data (and/or for the account associated with the account data)), etc.

It should be appreciated that resolution of proxies (into the account data) may include transmission of the proxies and/or identifying data, such as, for example, account data. In connection therewith, the service core 102 may be specific to one or more regions, within which identifying data is permitted to be transmitted. In one or more embodiments, the system 100 may traverse many regions, whereby a service core is included in the different regions.

As shown in FIG. 1, the system 100 generally includes two regions, Region A and Region B. In this example embodiment, the regions are geographically distinct. As such, for example, region A may include the United States, or North America, and Region B may include Germany, or Europe. The regions may be subject to various regulations, including, for example, on-soil regulations related to restrictions on transmitting of identifying information out of the regions. The regions may also be associated with other regulations, related to transmission of identifying information, or otherwise, etc. Further, in FIG. 1, the system 100 includes the service core 102, which is located in region A, and a second example service core 106, which is located in region B. While not shown, the service core 106 should be understood to be associated with a number of participants (e.g., similar to participants 104A, 104B, etc.). It should be also understood that the service core 106 is generally identical to the service core 102, whereby the description of the service core 102 is applicable to the service core 106, and vice-versa. It should also be understood that another system embodiment may include additional regions, in which additional services cores and participants may be located. What's more, while only two participants 104A, 104B are illustrated in FIG. 1, in connection with the service core 102, numerous participants may be included in other system embodiments in association with the service core 102. In addition, numerous participants may be located in each of the different regions (e.g., whereby the service core 106 is also associated with one or more participants in region B, etc.).

In this example embodiment, the service core 102, the participants 104, and the duplicate service core 106 are configured to interact with one another, for example, to exchange proxies and/or to retrieve identifying data associated with the proxies (e.g., where the identifying data is the account number, etc.). In general, the participants 104 interact with one another through the service core 102 in region A, or through the service core 102 and a local service core in a different region when interacting with participants in the different region.

It should be appreciated that region A and region B are denoted herein as geographically different regions. It should be understood however that region A and region B may be representative of different financial schemes, such as, for example, different payment networks, or different transaction types (e.g., real-time payment, conventional four party payments, etc.), whereby the interactions therebetween are secured through the description herein (where region A and region B may then be the same geographic region or not).

In connection with the above, the service core 102 includes a core authentication service 102.1 and a core vault 102.2, and the service core 106 includes a core authentication service 106.1 and a core vault 106.2. Similarly, each of the participants 104A, 104B includes an authentication service, which is referenced 104A.1 and 104B.1, and also a participant vault, which is referenced 104A.2 and 104B.2, as shown in FIG. 1. The authentication services and vaults are configured, as explained below, to distribute and deploy security key pairs, which may then be used, in turn, to authenticate participants and/or to permit resolution of proxies.

In this example embodiment, the service core 102 is further configured to generate layers of security keys, whereby trust is established with the participants 104 and between the participants 104, as described more below. In this embodiment, the multiple layers include a root layer, an intermediate layer and a central layer.

In particular, initially, the service core 102 is configured to disseminate a root certificate. That is, the authentication service 102.1 of the service core 102 is configured to request creation of the root certificate for itself, whereby the core vault 102.2 is configured to generate the root certificate, including root public-private key pairs specific to the service core 102. The core vault 102.2 may be configured as a certificate authority, in this example, to sign the certificate, or alternatively, the core vault 102.2 may be configured to interact with a third-party certificate authority to sign the root certificate. The third-party certificate authority may be widely understood to be trustworthy, as a basis for trust for the certificate. Regardless of the signature for the certificate, the core vault 102.2 is configured to store the private key for the root key pair, and to return the root certificate (including the public root key) to the core authentication service 102.1.

In turn, the core authentication service 102.1 is configured to disseminate the root certificate to each of the participants 104A, 104B and also the service core 106 (and to other service cores in other regions, in other embodiments). The participants 104A, 104B and also the service core 106 are configured to store the root certificate in their respective vaults 104A.2, 104B.2 and 106.2, in association with the service core 102. Also, the service core 106 (and other service cores) is further configured to disseminate or distribute the root certificate to connected participants in region B. It should be understood that the root certificate includes a long life, such as, for example, many months, years, or longer, etc.

In addition to the root certificate, the service core 102 is also configured in this example embodiment to disseminate an intermediate certificate. The intermediate certificate includes a life shorter than the root certificate, and may be weeks, months, or a year, etc. That is, the authentication service 102.1 of the service core 102 is configured to request creation of the intermediate certificate for itself, whereby the core vault 102.2 is configured to generate the intermediate certificate, including an intermediate public-private key pair specific to the service core 102. The core vault 102.2 is configured to then sign the certificate with the root key/certificate, thereby extending the trust imparted to the root certificate and signing certificate authority to the intermediate certificate. The core vault 102.2 is configured to store the private key for the intermediate key pair, and to return the intermediate certificate to the core authentication service 102.1.

In turn, the core authentication service 102.1 is configured to disseminate the intermediate certificate to each of the participants 104A, 104B and also the service core 106 (and to other service cores in other regions, in other embodiments). It should be appreciated that the intermediate certificate is generally the same for each of the participants 104 and the service core 106 in this example embodiment (but, may be different in other embodiments). The participants 104A, 104B and also the service core 106, in turn, are configured to store the intermediate certificate in their respective vaults 104A.2, 104B.2 and 106.2. The service core 106 is further configured, as above, to disseminate or distribute the intermediate certificate to the connected participants in region B, etc.

And, also, in the example embodiment of FIG. 1, the service core 102 is configured to disseminate a central certificate, which includes a life shorter than the intermediate certificate. In at least one example, the central certificate may expire daily, or weekly, or longer or shorter, etc. The authentication service 102.1 of the service core 102 is configured to request creation of the central certificate for itself, whereby the core vault 102.2 is configured to generate the central certificate, including a central public-private key pair specific to the service core 102. The core vault 102.2 is configured to then sign the central certificate with the intermediate key/certificate. The core vault 102.2 is configured to store the private key for the central key pair, and to return the central certificate to the core authentication service 102.1.

In turn, the core authentication service 102.1 is configured to disseminate the central certificate to each of the participants 104A, 104B and also the service core 106 (and to other service cores in other regions, in other embodiments). It should be appreciated that, for the central certificate, in this example embodiment, the service core 102 is configured to generate the same certificate for each of the participants 104 and the service core 106. The participants 104A, 104B and also the service core 106 are configured to store the central certificate in their respective vaults 104A.2, 104B.2 and 106.2. The service core 106 is configured to also disseminate or distribute the central certificate to the connected participants in region B, etc.

Based on the above, each of the vaults in the system 100 (e.g., core vault 102.2, participant vault 104A.2, participant vault 104B.2, core vault 106.2, etc.) is populated with three layers of certificates, and associated public keys, for the service core 102, where each of the certificates has a different life (i.e., before expiration, etc.). It should be appreciated that the above is repeated for the service core 106, and any additional service cores in the various other system embodiment. In connection therewith, it should be appreciated that the certificates are disseminated or distributed to participants 104 in the same region and also service cores in other regions, whereby the same are disseminated or distributed to participants in the other regions, etc.

Further in this example embodiment, when the service core 102 is deployed, the participants 104 are configured to deploy certificate/keys within the system 100, to enable messaging originating from the participants.

In particular, for example, the authentication service 104A.1 is configured to request the vault 104A.2 to create the participant key pair and a signing request for a certificate specific to the participant 104. The vault 104A.2 is configured to generate a key pair including a participant private key and a participant public key, and also the participant certificate signing request including at least the participant public key. The vault 104A.2 is configured to submit the participant certificate signing request to the authentication service 104A.1. The authentication signing service 104A.1, in turn, is configured to submit the signing request (and certificate) to the service core 102, and in particular, the core authentication service 102.1.

The core authentication service 102.1 is configured to assess the source and/or channel of the signing request. That is, for example, the core vault 102.2 may be configured to determine whether the channel is certified and/or defined as an official channel, and also that the participant 104A is a legitimate participant in the system 100. When the assessment is satisfactory, valid and/or confirmed, the core authentication service 102.1 is then configured to submit the signing request to the core vault 102.2.

In response, the core vault 102.2 is configured to process the signing request. In connection therewith, the core vault 102.2 is configured to assess the format of the request, including, for example, confirming the content of the request, ordering of the content, etc. In addition, the core vault 102.2. may be configured to assess the request relative to one or more rules related to signing certificates and/or life time of certificates (e.g., expiration relative to type of certificate, etc.). When the request is satisfactory, valid or confirmed in view of the assessment, the core vault 102.2 is configured to create a certificate signed with the intermediate private key (e.g., the public key generated by the participant value 104A.2 is included in a certificate and the certificate is signed, etc.) and to return the signed certificate to the core authentication service 102.1.

The core authentication service 102.1, in turn, is configured to disseminate or distribute the signed certificate, which includes the public key of the participant 104A, back to participant 104A, to the participant 104B and also the service core 106, etc. In this manner, each of the participant 104B and the service core 106 is configured to assess the signing authority of the public key based on the intermediate certificate, and potentially, based on the root certificate (i.e., based on the intermediate certificate being signed with the root key and/or the associated certificate authority, etc.). The participant 104B, and in particular, the authentication service 104B.1 may be configured to pass the public certificate to the vault 104B.2, which, in turn, may be configured to verify the public certificate of the participant 104A (based on the intermediate and/or root certificate) prior to storing the same. The service core 106 is further configured to disseminate or distribute the participant 104A certificate to the connected participants in region B, etc.

Thereafter, the participant 104A, for example, is configured to interact with the participant 104B, and vice-versa, whereby encrypted messaging therebetween is based on initiation by the participant 104A by signing with its participant private key, which is then verified, by the participant 104B, with the associated public key disseminated by the participant 104A above.

In connection therewith, interaction(s) may include one or more response messages, for example, from the participant 104B (or other participant(s)) to the participant 104A. The participant 104B (or other participant(s)) may be configured to encrypt some or all of the data included in the response message(s) (e.g., sensitive information, etc.), with the public key disseminated by the participant 104A. It should be appreciate that response message(s) to/from any of the participants or service core etc., may be similarly encrypted and/or otherwise secured based on one or more of the public keys distributed by the participant originating or initiating the interaction(s).

The participant 104B is configured to disseminate or distribute a signed certificate with a public key specific to the participant 104B in generally the same manner.

Thereafter, in connection with resolving proxies, encrypted messaging by and among the service core 102, the participants 104A, 104B and the service core 106 are enabled through use of one or more of the disseminated certificates (e.g., a central certificate or a participant certificate, etc.). The messaging, especially as it relates to resolving a proxy, may be consistent with the messaging described in U.S. Provisional Application No. 63/406,542, filed on Sep. 14, 2022, which is incorporated herein by reference.

It should be appreciated that the service core 102 may be further configured to provide batch deployment of certificates to additional participants and/or core services to provide for communication with the additional participant(s) and/or core service(s), without each core service and/or participant having to be deployed again. That is, after the participants 104A, 104B have deployed participant certificates, the service core 102 may be configured to deploy the associated participant certificates to a new participant in system 100 without the participant 104A, for example, being required to repeat the above operation to disseminate its certificate to the new participant.

It should be further appreciated that the service core 102, the participants 104A, 104B, and the service core 106 may be configured to perform one or more of the operations above in connection with the expiration of a certificate, whereby a replacement certificate is deployed in the system 100.

Figure 2:
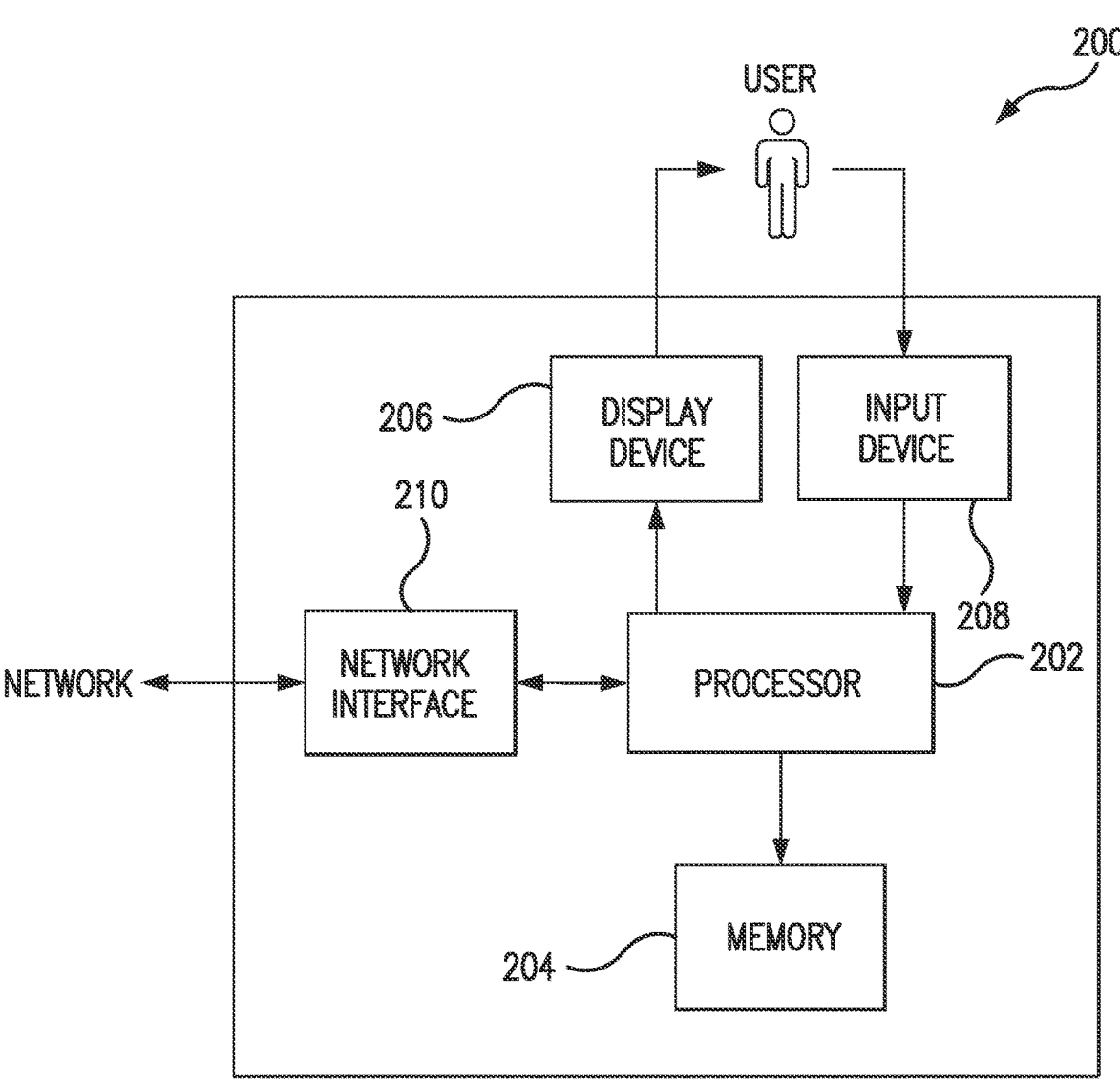
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the service core 102, the participants 104A, 104B, and the core service 106 may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, routing logic, proxies, account data, proxy directories, message formats/formatting, sequence stacks, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, method 400, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 and an input device 208.

The presentation unit 206 is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., account data, proxies, etc.), etc. And, various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The input device 208 receives inputs from the user (i.e., user inputs) of the computing device 200 such as, for example, inputs to register/define a proxy for an account, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a BLUETOOTH adapter, etc.), a mobile network adapter, or other device capable of communicating to one or more different networks herein and/or with other devices described herein. In some example embodiments, the computing device 200 may include the processor 202 and one or more network interfaces incorporated into or with the processor 202.

Figure 3:
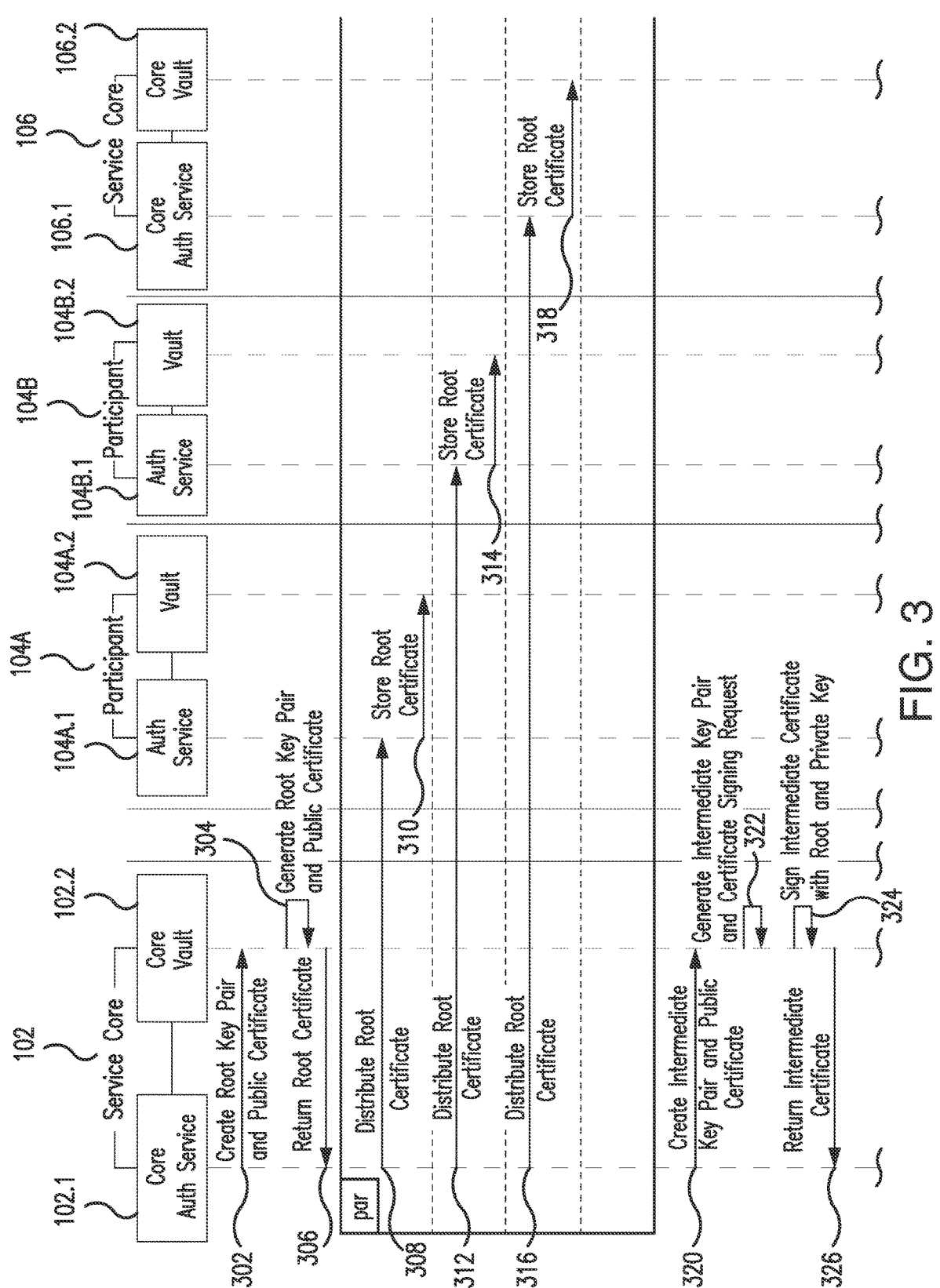
FIG. 3 illustrates an example method, which may be implemented in the system of FIG. 1, for use in distribution of keys usable in connection with identifying data.
Figure 3:
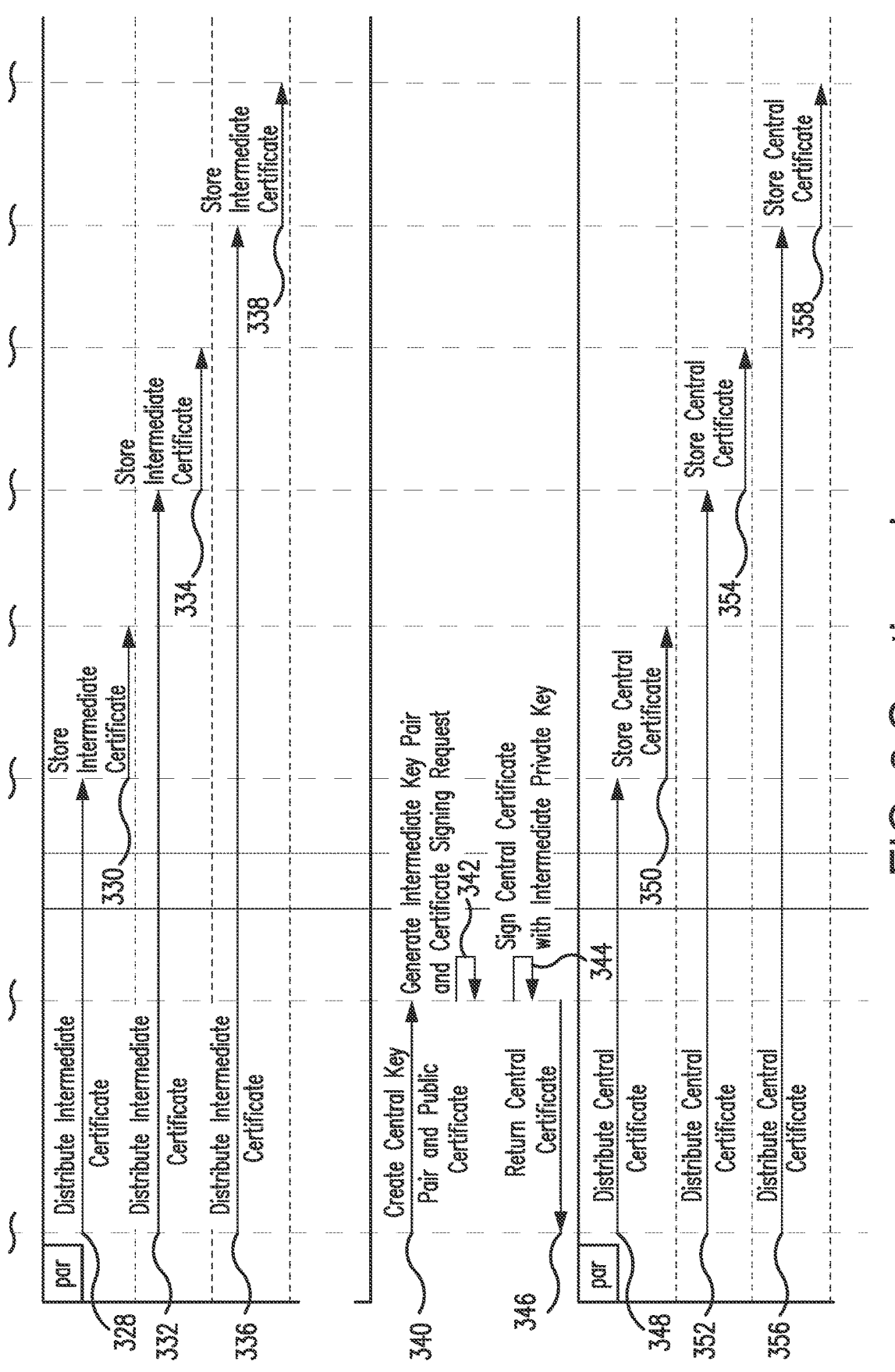

FIG. 3 illustrates an example method 300 for use in distribution of keys in association with proxy resolution. The example method 300 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

At the outset, in method 300, the service core 102 is being deployed in the system 100, among the participants 104A, 104B and the different service core 106 (e.g., located in a different region than the service core 102 and the participants 104A, 104B, etc.). In order for the participants 104A, 104B to trust the service core 102, and more particularly, messages therefrom, the layered certificates (and keys) are deployed in this exemplary embodiment, as shown.

Initially, the service core 102 disseminates a root certificate. In connection therewith, at 302, the authentication service 102.1 of the service core 102 submits a request, to the core vault 102.2, to create a root key pair and public certificate (including the root public key). The core vault 102.2 generates, at 304, the root key pair, including a root private key and a root public key, and stores the private key therein. Further, at 304, the core vault 102.2 generates a public key certificate. In doing so, the core vault 102.2 compiles the public key certificate (e.g., to include the root public key, the identity of the service core 102, an indication of a certificate authority (CA), etc.) and then requests that a certificate authority, in this example, sign the certificate. The certificate authority (not shown, but which may be the core vault 102.2 in some embodiments), in turn, assesses the request, and if proper (e.g., correct format, proper channel, trusted relationship with the service core 102, etc.), signs the certificate and returns the same to the core vault 102.2.

The core vault 102.2 returns, at 306, the signed root certificate to the core authentication service 102.1.

At 308 (e.g., as part of a parallel (par) routine among different participants, etc.), the authentication service 102.1 distributes the root certificate to the participant 104A. In turn, if the certificate authority is trusted, the authentication service 104A.1 of the participant 104A stores, at 310, the signed root certificate in the vault 104A.2. At 312, the authentication service 102.1 distributes the root certificate to the participant 104B. In turn, if the certificate authority is trusted, the authentication service 104B.1 of the participant 104B stores, at 314, the signed root certificate in the vault 104B.2. At 316, the authentication service 102.1 distributes the root certificate to the service core 106. In turn, if the certificate authority is trusted by the service core 106, the authentication service 106.1 of the service core 106 stores, at 318, the signed root certificate in the core vault 106.2 (and potentially, disseminates the signed root certificate to participants in the region).

Next, as shown in FIG. 3, the service core 102 disseminates an intermediate (or intermediary) certificate, which has a shorter life than the root certificate. In connection therewith, at 320, the authentication service 102.1 submits a request, to the core vault 102.2, to create an intermediate key pair and public certificate (including the intermediate public key). The core vault 102.2 generates, at 322, the intermediate key pair, including the intermediate private key and the intermediate public key, and stores the intermediate private key therein. Further, at 324, the core vault 102.2 generates an intermediate public key certificate and signs the certificate with the root private key. The intermediate public key certificate includes, for example, the intermediate public key, the identity of the service core 102, an indication of a certificate authority by the root private key, etc. The core vault 102.2 returns, at 326, the signed intermediate certificate to the core authentication service 102.1.

At 328, the authentication service 102.1 distributes the intermediate certificate to the participant 104A. In turn, if the certificate authority is trusted, the authentication service

104A.1 of the participant 104A stores, at 330, the signed intermediate certificate in the vault 104A.2. At 332, the authentication service 102.1 distributes the intermediate certificate to the participant 104B. In turn, if the certificate authority is trusted, the authentication service 104B.1 of the participant 104B stores, at 334, the signed intermediate certificate in the vault 104B.2. At 336, the authentication service 102.1 distributes the intermediate certificate to the service core 106. In turn, if the certificate authority is trusted by the service core 106, the authentication service 106.1 of the service core 106 stores, at 338, the signed intermediate certificate in the core vault 106.2.

With continued reference to FIG. 3, next, the service core 102 disseminates a central certificate, which has an even shorter life than the intermediate certificate (e.g., one day, one week, etc.). In particular, at 340, the authentication service 102.1 submits a request, to the core vault 102.2, to create a central key pair and public certificate (including the central public key). The core vault 102.2 generates, at 342, the central key pair, including the central private key and the central public key, and stores the central private key therein. Further, at 344, the core vault 102.2 generates a central public key certificate and signs the certificate with the intermediate private key. The central public key certificate includes, for example, the central public key, the identity of the service core 102, an indication of a certificate authority by the root private key, etc. The core vault 102.2 returns, at 346, the signed central certificate to the core authentication service 102.1.

At 348, the authentication service 102.1 distributes the central certificate to the participant 104A. In turn, if the certificate authority is trusted, the authentication service 104A.1 of the participant 104A stores, at 350, the signed central certificate in the vault 104A.2. At 352, the authentication service 102.1 distributes the central certificate to the participant 104B. In turn, if the certificate authority is trusted, the authentication service 104B.1 of the participant 104B stores, at 354, the signed central certificate in the vault 104B.2. At 356, the authentication service 102.1 distributes the central certificate to the service core 106. In turn, if the certificate authority is trusted by the service core 106, the authentication service 106.1 of the service core 106 stores, at 358, the signed central certificate in the core vault 106.2.

Based on the above, the service core 102 is deployed within the system 100, whereby each of the participants 104A, 104B and the service core 106 includes layers of certificates, which form a basis for trusting communications from the service core 102. The central certificate is then used for common messaging and/or communication, the intermediate certificate is used for deploying or refreshing central certificates and/or participants certificates, and the root certificate is then used, in this example, to deploy or refresh intermediate certificates.

Figure 4:
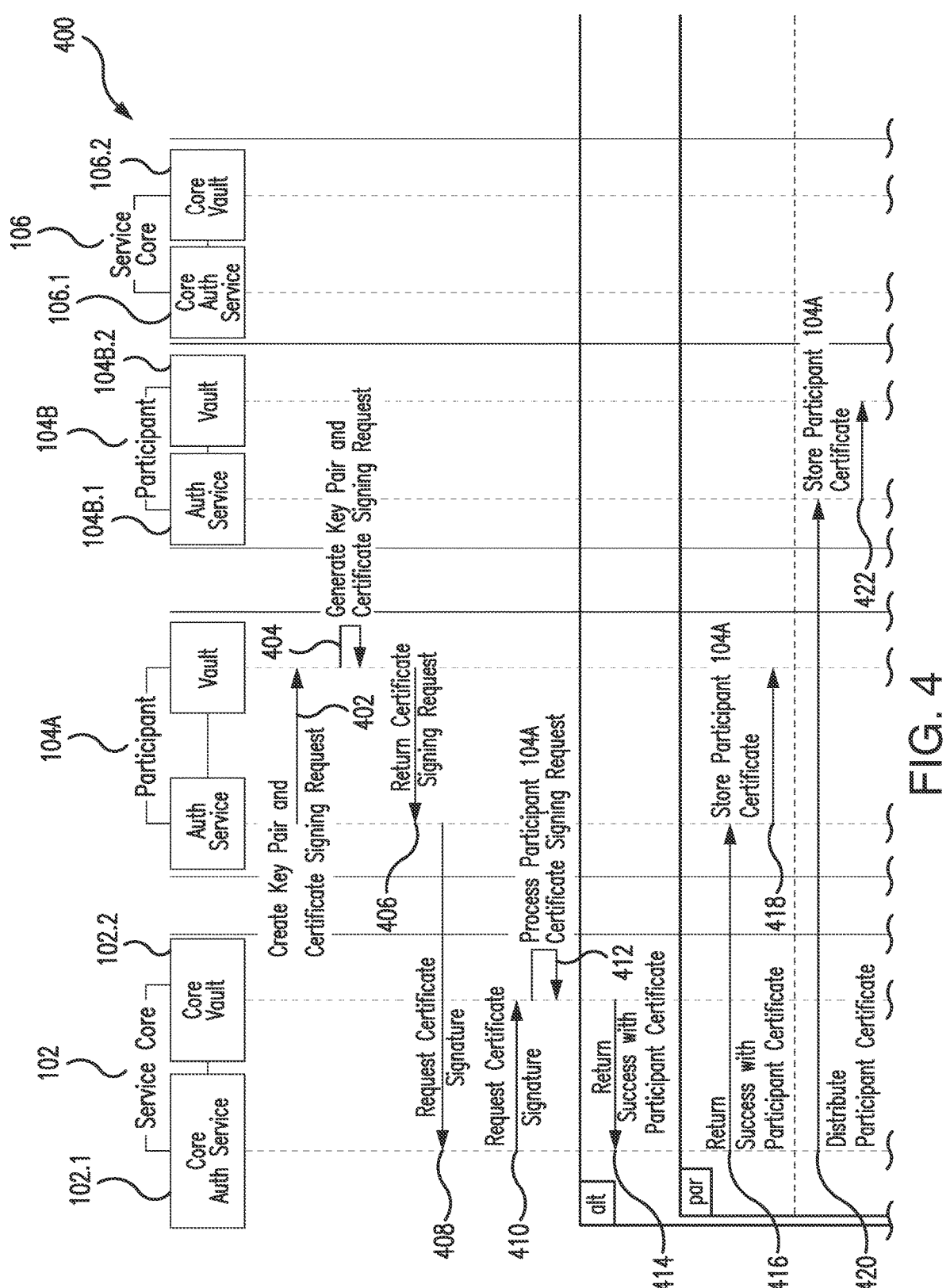
FIG. 4 illustrates another example method, which may be implemented in the system of FIG. 1, for use in deployment of keys usable in connection with identifying data.
Figure 4:
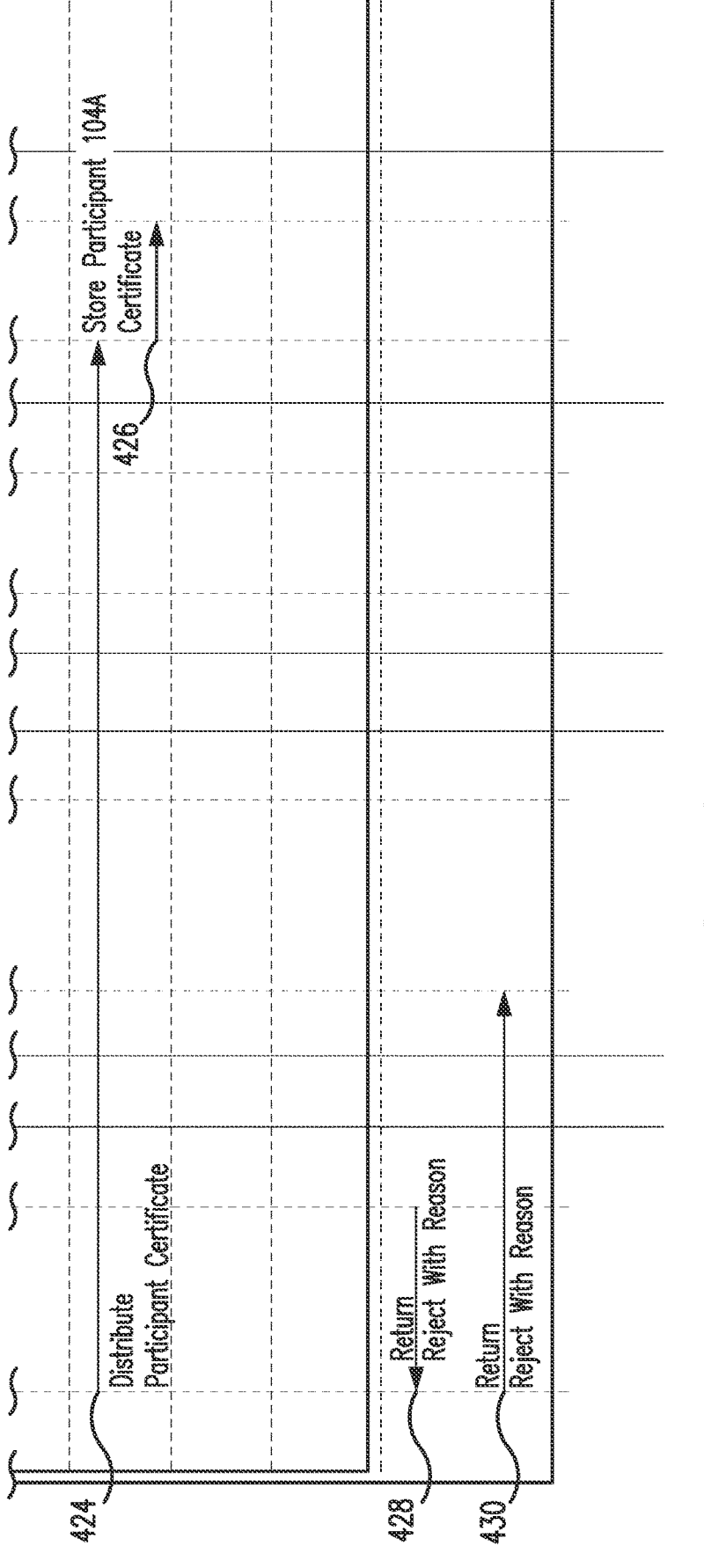

FIG. 4 illustrates an example method 400 for use in distribution of keys in association with proxy resolution. The example method 400 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 400.

Generally subsequent to the example method 300, described above, the participants 104A, 104B include and/or store certificates from the service core 102 in their respective vaults 104A.2, 104B.2. In connection therewith, the participants 104 may then seek to deploy participant certificates in the system 100, through the method 400, to enable messaging originating from the participants.

In this example embodiment, the authentication service 104A.1 requests, at 402, the vault 104A.2 to create a participant certificate key pair and certificate signing request. In turn, the vault 104A.2 generates, at 404, a participant key pair, including a participant private key and a participant public key. Further, at 404, the vault 104A.2 generates a certificate signing request, which includes the participant certificate. The participant certificate includes the participant public key, the identity of the participant 104A, and an indication of the service core 102 as the certificate authority for the certificate. The vault 104A.2 returns, at 406, the signing request to the authentication service 104A.1.

At 408, the authentication service 104A.1 requests that the service core 102 sign the participant certificate. At 410, the authentication service 102.1 submits the request for the certificate signature to the core vault 102.2.

In turn, the core vault 102.2 is configured to process the request, at 412. In connection therewith, the core vault 102.2 may assess the source and/or channel of the request. That is, for example, the core vault 102.2 may determine whether the channel is a certified and/or official channel, and also that the participant 104A is a legitimate participant in the system 100. Further, the core vault 102.2. may be configured to assess the format of the request, including, for example, confirming the content of the request, ordering of the content, etc. In addition, the core vault 102.2. may assess the request relative to one or more rules related to signing certificates and/or life time of certificates (e.g., expiration relative to type of certificate, etc.). When satisfied by the assessment, the core vault 102.2 signs the participant certificate with the intermediate private key and returns the signed certificate to the core authentication service 102.1, at 414. In connection therewith, the core vault 102.2 further stores the participant certificates.

The core authentication service 102.1, in turn, disseminates the signed participant certificate, which includes the public key of the participant 104A, to the participant 104B and also the service core 106, etc. In particular, at 416, the authentication service 102.1 disseminates the participant certificate to the participant 104A. The authentication service 104A.1 of the participant 104A stores, at 418, the signed participant certificate in the vault 104A.2. At 420, the authentication service 102.1 disseminates the participant certificate to the participant 104B. In turn, if the certificate authority is trusted, the authentication service 104B.1 of the participant 104B stores, at 422, the signed participant certificate in the vault 104B.2. At 424, the authentication service 102.1 disseminates the participant certificate to the service core 106. In turn, if the certificate authority is trusted by the service core 106, the authentication service 106.1 of the service core 106 stores, at 426, the signed participant certificate in the core vault 106.2. The service core 106 also disseminates the certificate for participant 104A to the connected participants in region B.

Conversely, when the assessment of the request to sign the participant certificate (at 412) indicates rejection of the request, the core vault 102.2 returns, at 428, a rejection to the authentication service 102.1 for the signing request. In turn, at 430, the authentication service 102.1 returns the rejection to the participant 104A. The returned rejection, in this example, includes a reason for the rejection.

Thereafter, the participant 104A, for example, is configured to interact, via a request, with the participant 104B, the service core 102, or any other participants which are part of the service, and vice-versa, whereby secure messaging therebetween is based on initiation by the participant 104A by creating and signing, with its participant private key, an authentication token, which is then verified, by the participant 104B, or other equivalent recipient, with the associated public key from the certificate disseminated by the participant 104A above. It should be noted that, as the certificates are disseminated, a participant from region B, for example, is permitted to also validate the authentication token in a request from the participants 104A, 104B in region A (or other participants in other regions), using the public certificate disseminated by the participants.

Further, the participant 104B, for example, in response to a request initiated by 104A, the service core 102, or any other participants joined to the service, can encrypt any sensitive data included in the response to that entity, using the public key from the certificate previously disseminated by that entity. It should be noted that, as the certificates are disseminated, a participant from region B, for example, is permitted to also encrypt sensitive data in response to a request from the participants 104A, 104B in region A (or other participants in other regions), using the public certificate disseminated by the participants.

In view of the above, the systems and method herein provide for messaging security among different service cores and participants, based on a layered key approach. In this manner, a level of trust may be generated and serviceable (e.g., based on the layer certificates with different expiration, etc.), whereby the participants may be in different geographic regions or different financial schemes, etc., yet still permitted to rely on the trust extending through the layers based on the original certificate authority, regardless of the participant (e.g., an unknown participant to the recipient, etc.) from which a message is originated.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) distributing, by a service core computing device, a root certificate signed by a certificate authority and an intermediate certificate, which is signed by a root private key associated with the root certificate; (b) receiving, from a participant, a signing request for a participant certificate, the participant certificate including a participant public key; (c) assessing, by the service core computing device, the signing request for the participant certificate; (d) signing, by the service core computing device, the participant certificate with an intermediate public key included in the intermediate certificate; and/or (e) disseminating the signed participant certificate to the participant and at least one other participant, whereby the at least one other participant relies on the participant certificate based on the participant certificate being signed by the intermediate public key, which is dependent on the root certificate.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:

distributing, by a service core computing device, a root certificate signed by a certificate authority and an intermediate certificate, which is signed by a root private key associated with the root certificate, the root certificate having a longer life to expiration than the intermediate certificate;

receiving, from a participant, a signing request for a participant certificate, the participant certificate including a participant public key, the participant certificate having a shorter life to expiration than the intermediate certificate;

assessing, by the service core computing device, the signing request for the participant certificate, based on ordering of content in the signing request;

signing, by the service core computing device, the participant certificate with an intermediate public key included in the intermediate certificate;

disseminating the signed participant certificate to the participant and at least one other participant, whereby the at least one other participant trusts a request from the participant, which is signed by a private key of the participant, based on the participant certificate including the public key validating the signed request and the participant certificate being signed by the intermediate public key, which is dependent on the root certificate;

receiving, by the service core computing device, a message from the participant; and encrypting data, by the service core computing device, based on the participant certificate of the participant, prior to providing the encrypted data to the participant in response to the message.

2. The computer-implemented method of claim 1, wherein the certificate authority is a third party relative to the service core and the participant; and wherein the root certificate includes an indication of the certificate authority.

3. The computer-implemented method of claim 1, wherein assessing the signing request is further based on a channel through which the signing request is received.

4. The computer-implemented method of claim 1, wherein assessing the signing request includes assessing a life to expiration of the participant certificate.

5. The computer-implemented method of claim 1, wherein the service core computing device includes an authentication service and a core vault;

wherein receiving the signing request includes receiving, by the authentication service, the signing request; and wherein assessing the signing request and signing the participant certificate includes assessing, by the core vault, the signing request and signing, by the core vault, the participant certificate.

6. The computer-implemented method of claim 1, further comprising signing the intermediate certificate with the root private key, which forms a key pair with a root public key.

7. The computer-implemented method of claim 1, further comprising authenticating a message sender of the message based on the disseminated participant certificate prior to providing the encrypted data to the participant in response to the message.

8. The computer-implemented method of claim 1, further comprising distributing, by the service core computing device, a central certificate signed by an intermediate private key associated with the root certificate.

9. A non-transitory computer-readable storage medium comprising executable instructions, which when executed by at least one processor in deploying keys in connection with proxy resolution, cause the at least one processor to:

distribute a root certificate signed by a certificate authority and an intermediate certificate, which is signed by a root private key associated with the root certificate, the root certificate having a longer life to expiration than the intermediate certificate;

receive, from a participant, a signing request for a participant certificate, the participant certificate including a participant public key, the participant certificate having a shorter life to expiration than the intermediate certificate;

assess the signing request for the participant certificate, based on ordering of content in the signing request;

sign the participant certificate with an intermediate public key included in the intermediate certificate; and disseminate the signed participant certificate to the participant and at least one other participant, whereby the at least one other participant trusts a request from the participant, which is signed by a private key of the participant, based on the participant certificate including the public key validating the signed request and the participant certificate being signed by the intermediate public key, which is dependent on the root certificate;

receive a message from the participant; and encrypt data, based on the participant certificate of the participant, prior to providing the encrypted data to the participant in response to the message.

10. The non-transitory computer-readable storage medium of claim 9, wherein the executable instructions, when executed by the at least one processor to assess the signing request, further cause the at least one processor to:

assess a channel through which the signing request is received; and assess a life to expiration of the participant certificate.

11. The non-transitory computer-readable storage medium of claim 9, wherein the executable instructions, when executed by the at least one processor, further cause the at least one processor to sign the intermediate certificate with the root private key, which forms a key pair with a root public key.

12. The non-transitory computer-readable storage medium of claim 9, wherein the executable instructions, when executed by the at least one processor, further cause the at least one processor to authenticate a message sender of the message based on the disseminated participant certificate prior to providing the encrypted data in response to the message.

13. The non-transitory computer-readable storage medium of claim 9, wherein the executable instructions, when executed by the at least one processor, further cause the at least one processor to distribute a central certificate signed by an intermediate private key associated with the root certificate.

14. A computer-implemented method comprising:

distributing, by a service core computing device, a root certificate signed by a certificate authority and an intermediate certificate, which is signed by a root private key associated with the root certificate, the root certificate having a longer life to expiration than the intermediate certificate;

receiving, from a participant, a signing request for a participant certificate, the participant certificate including a participant public key, the participant certificate having a shorter life to expiration than the intermediate certificate;

assessing, by the service core computing device, the signing request for the participant certificate, based on ordering of content in the signing request;

signing, by the service core computing device, the participant certificate with an intermediate public key included in the intermediate certificate;

disseminating the signed participant certificate to the participant and at least one other participant, whereby the at least one other participant trusts a request from the participant, which is signed by a private key of the participant, based on the participant certificate including the public key validating the signed request and the participant certificate being signed by the intermediate public key, which is dependent on the root certificate;

receiving, by a computing device of a second participant, a message from the participant; and encrypting data, by the computing device of the second participant, based on the participant certificate of the participant, prior to providing the encrypted data to the participant in response to the message.

15. The computer-implemented method of claim 14, wherein the certificate authority is a third party relative to the service core and the participant; and wherein the root certificate includes an indication of the certificate authority.

16. The computer-implemented method of claim 14, wherein assessing the signing request is further based on a channel through which the signing request is received.

17. The computer-implemented method of claim 14, wherein assessing the signing request includes assessing a life to expiration of the participant certificate.

18. The computer-implemented method of claim 14, further comprising authenticating a message sender of the message based on the disseminated participant certificate prior to providing the encrypted data in response to the message.

19. The computer-implemented method of claim 14, wherein the participant and the second participant are included in different geographic regions.

* * * * *